(12) United States Patent
Oh et al.

(10) Patent No.: US 11,332,617 B2
(45) Date of Patent: May 17, 2022

(54) POLYARYLENE SULFIDE RESIN COMPOSITION HAVING EXCELLENT MECHANICAL AND CORROSION PROPERTIES

(71) Applicant: HDC POLYALL CO., LTD., Ulsan (KR)

(72) Inventors: Hyeoung-geun Oh, Seongnam-si (KR); Jong-Wook Shin, Seongnam-si (KR); Myung-wook Jung, Seongnam-si (KR); Se-ran Choi, Seongnam-si (KR); Hae-ri Kim, Seongnam-si (KR)

(73) Assignee: HDC POLYALL CO.. LTD., Ulsan (KR)

( * ) Notice: Subject to any disclaimer, the term of this patent is extended or adjusted under 35 U.S.C. 154(b) by 0 days.

(21) Appl. No.: 16/958,462

(22) PCT Filed: Dec. 26, 2018

(86) PCT No.: PCT/KR2018/016669
§ 371 (c)(1),
(2) Date: Jun. 26, 2020

(87) PCT Pub. No.: WO2019/132513
PCT Pub. Date: Jul. 4, 2019

(65) Prior Publication Data
US 2021/0095123 A1 Apr. 1, 2021

(30) Foreign Application Priority Data
Dec. 28, 2017 (KR) .................. 10-2017-0182038

(51) Int. Cl.
| | | |
|---|---|---|
| *C08L 81/02* | (2006.01) | |
| *C08K 3/08* | (2006.01) | |
| *C08K 3/38* | (2006.01) | |
| *C08K 7/14* | (2006.01) | |
| *B29C 45/00* | (2006.01) | |
| *C08K 5/541* | (2006.01) | |
| *C08K 5/544* | (2006.01) | |
| *C08K 5/548* | (2006.01) | |
| *C08K 7/18* | (2006.01) | |
| *C08K 9/06* | (2006.01) | |
| *B29K 81/00* | (2006.01) | |

(52) U.S. Cl.
CPC .......... *C08L 81/02* (2013.01); *B29C 45/0001* (2013.01); *C08K 3/08* (2013.01); *C08K 3/38* (2013.01); *C08K 5/541* (2013.01); *C08K 5/544* (2013.01); *C08K 5/548* (2013.01); *C08K 7/14* (2013.01); *C08K 7/18* (2013.01); *C08K 9/06* (2013.01); *B29K 2081/04* (2013.01); *C08K 2003/085* (2013.01); *C08K 2003/0831* (2013.01); *C08K 2003/0862* (2013.01); *C08K 2003/0881* (2013.01); *C08K 2003/385* (2013.01); *C08K 2003/387* (2013.01); *C08K 2201/001* (2013.01); *C08K 2201/003* (2013.01); *C08K 2201/004* (2013.01); *C08L 2201/02* (2013.01); *C08L 2201/08* (2013.01); *C08L 2201/10* (2013.01); *C08L 2203/20* (2013.01); *C08L 2205/24* (2013.01)

(58) Field of Classification Search
CPC ................................. C08K 7/04; C08K 3/08
See application file for complete search history.

(56) References Cited

U.S. PATENT DOCUMENTS

| | | |
|---|---|---|
| 2013/0156565 A1 | 6/2013 | Feng |
| 2014/0343215 A1 | 11/2014 | Ouchiyama et al. |
| 2015/0275063 A1 | 10/2015 | Raman et al. |
| 2017/0096557 A1 | 4/2017 | Ohnishi et al. |
| 2019/0144609 A1* | 5/2019 | Kim .................. C08K 3/40 524/262 |

FOREIGN PATENT DOCUMENTS

| | | | |
|---|---|---|---|
| CN | 105970333 A | * | 9/2016 |
| JP | 2007070587 A | * | 3/2007 |
| JP | 4730633 B2 | | 7/2011 |
| KR | 10-2010-0012878 A | | 2/2010 |
| KR | 10-1082636 B1 | | 11/2011 |
| KR | 10-2013-0020860 A | | 3/2013 |
| KR | 10-1475658 B1 | | 12/2014 |
| KR | 10-2016-0134030 A | | 11/2016 |
| KR | 10-2017-0122193 A | | 11/2017 |
| KR | 10-2017-0130837 A | | 11/2017 |

OTHER PUBLICATIONS

Machine translation of CN-105970333-A (Year: 2016).*
Machine translation of JP-2007070587-A (Year: 2007).*
International Search Report for PCT/KR2018/016669 dated Apr. 5, 2019 [PCT/ISA/210].

* cited by examiner

*Primary Examiner* — Wenwen Cai
(74) *Attorney, Agent, or Firm* — Sughrue Mion, PLLC

(57) ABSTRACT

A polyarylene sulfide resin composition contains a polyarylene sulfide resin, a transition metal particle, a fibrous inorganic filler, and an inorganic nucleating agent, and a molded article made from the resin composition. The resin composition has excellent mechanical, corrosion, and haze properties, and heat resistance. The resin composition prevents corrosion of a mold and deterioration in the durability of a manufactured product upon injection by effectively removing halogen-based impurities, and also has excellent mechanical, corrosion, and haze properties, and heat resistance. A molded article manufactured from the resin composition satisfies the standards required for components of a vehicle and an electric/electronic device.

19 Claims, No Drawings

POLYARYLENE SULFIDE RESIN COMPOSITION HAVING EXCELLENT MECHANICAL AND CORROSION PROPERTIES

CROSS REFERENCE TO RELATED APPLICATIONS

This application is a National Stage of International Application No. PCT/KR2018/016669 filed Dec. 26, 2018, claiming priority based on Korean Patent Application No. 10-2017-0182038 filed Dec. 28, 2017.

TECHNICAL FIELD

The present invention relates to a polyarylene sulfide resin composition, which is excellent in mechanical properties, anticorrosion characteristics, haze characteristics, and heat resistance, and to an article molded therefrom.

BACKGROUND ART

Polyarylene sulfide (PAS) is a thermoplastic resin having high-temperature thermal stability, flame retardancy, low moisture content, and the like. It has been advantageously used as a steel substitute and a structural material. In particular, polyphenylene sulfide (PPS) is excellent in chemical resistance by virtue of its structural features. Thus, it is widely used in automobile parts and electric and electronic parts that could not be replaced by conventional polyester resins and polyamide resins (see Korean Laid-open Patent Publication No. 2013-0020860 and Korean Patent Nos. 10-1082636 and 10-1475658).

Meanwhile, the thin film injection molding is commonly used in the production of molded articles due to the trend toward miniaturization and lightweight of automobile parts and electric and electronic parts. At the same time, improvements in the mechanical properties of small and thin molded articles as electric and electronic parts are required. In addition, PPS has mostly halogen-based byproducts. These byproducts not only cause problems such as corrosion of the mold at the time of injection molding, but also increase the defective rate of the product during the processing thereof and reduce the durability of the product. Accordingly, there is an increasing demand for a resin composition, which is excellent in injection processability and mechanical properties, thereby enhancing the durability of the product.

DISCLOSURE OF INVENTION

Technical Problem

Accordingly, an object of the present invention is to provide a resin composition, which is excellent in injection processability and mechanical properties and has improved haze characteristics and heat resistance, and an article molded therefrom.

Solution to Problem

In order to achieve the above object, the present invention provides a resin composition, which comprises a polyarylene sulfide resin, a transition metal particle, a fibrous inorganic filler, and an inorganic nucleating agent, wherein the resin composition comprises 0.05 to 5.0% by weight of the transition metal particle based on the total weight of the composition.

In addition, the present invention provides a molded article produced by molding the resin composition.

Advantageous Effects of Invention

The resin composition according to the present invention comprises a polyarylene sulfide resin and can effectively remove halogen-based byproducts during the processing thereof. Thus, it can enhance the durability of the mold by improving the corrosion phenomenon that may be caused during injection molding or in the processed product. In particular, since the resin composition is excellent in mechanical properties, haze characteristics, and heat resistance, it can satisfy the standards required for automobile parts and electric and electronic parts.

BEST MODE FOR CARRYING OUT THE INVENTION

The present invention provides a resin composition, which comprises a polyarylene sulfide resin, a transition metal particle, a fibrous inorganic filler, and an inorganic nucleating agent.

Polyarylene Sulfide Resin

The polyarylene sulfide resin may have a melt viscosity of 300 to 10,000 poises at 300° C. Specifically, the polyarylene sulfide resin may have a melt viscosity of 300 to 5,000 poises or 1,000 to 3,000 poises at 300° C.

The polyarylene sulfide resin may have a number average molecular weight of 5,000 to 30,000 g/mole. Specifically, the polyarylene sulfide resin may have a number average molecular weight of 7,000 to 30,000 g/mole or 8,000 to 20,000 g/mole.

Preferably, the polyarylene sulfide resin may have a melt viscosity of 300 to 10,000 poises at 300° C. and a number average molecular weight of 7,000 to 30,000 g/mole. If the melt viscosity of the polyarylene sulfide resin is within the above range, the injection processability of the resin composition may be enhanced. If the number average molecular weight of the polyarylene sulfide resin is within the above range, the mechanical properties of the processed product may be improved.

The polyarylene sulfide resin may have a melting point of 265 to 290° C., specifically 270 to 285° C. or 275 to 285° C.

The polyarylene sulfide resin may have a polydispersity index (PDI) of 1 to 10. Specifically, the polyarylene sulfide resin may have a polydispersity index (PDI) of 2 to 10, 2 to 8, or 2 to 5.

The polyarylene sulfide resin may be employed in an amount of 40 to 65% by weight based on the total weight of the resin composition. Specifically, the polyarylene sulfide resin may be employed in an amount of 50 to 65% by weight based on the total weight of the resin composition. If the polyarylene sulfide resin is employed in an amount of 40% by weight or more, the mechanical properties of the product thus produced would not be deteriorated. If it is employed in an amount of 65% by weight or less, the mechanical properties of the product thus produced would be enhanced.

The process for preparing the polyarylene sulfide resin is not particularly limited as long as it satisfies the above physical properties. For example, the polyarylene sulfide resin may be prepared by melt polymerization. Specifically, the polyarylene sulfide resin may be prepared by melt-polymerizing a reactant comprising a diiodide aromatic compound and a sulfur element.

The diiodide aromatic compound to be used in the above melt polymerization may be at least one selected from the group consisting of diiodobenzene (DIB), diiodonaphthalene, diiodobiphenyl, diiodobisphenol, and diiodobenzophenone, but it is not limited thereto. In addition, the diiodide aromatic compound may have a substituent such as an alkyl group or a sulfone group bonded to the above-mentioned compounds, or a diiodide aromatic compound in which an atom such as oxygen or nitrogen is contained in the aromatic group may also be used. Further, the diiodide aromatic compound has various isomers depending on the position where the iodine atom is attached. Among them, a compound in which iodine is attached to a para position such as para-diiodobenzene (p-DIB), 2,6-diiodonaphthalene, or p,p'-diiodobiphenyl may be more suitable The sulfur element to be reacted with the diiodide aromatic compound is not particularly limited. Normally, the sulfur element exists in cyclooctasulfur ($S_8$) at room temperature in which eight atoms are connected. If sulfur is commercially available in any solid or liquid state other than the above form, it can be used without limitation.

The reactant, which comprises the diiodide aromatic compound and the sulfur element, may further comprise a polymerization initiator, a stabilizer, or a mixture thereof. Specifically, the polymerization initiator may be at least one selected from the group consisting of 1,3-diiodo-4-nitrobenzene, mercaptobenzothiazole, 2,2'-dithiobenzothiazole, cyclohexylbenzothiazole sulfenamide, and butylbenzothiazole sulfenamide, but it is not limited thereto. The stabilizer is not particularly limited as long as it is a stabilizer commonly used in the polymerization reaction of a resin.

Meanwhile, a polymerization terminator may be added to the reactant during the polymerization thereof. The polymerization terminator is not particularly limited as long as it is a compound capable of stopping the polymerization by removing the iodine group contained in the polymer to be polymerized. Specifically, the polymerization terminator may be at least one selected from the group consisting of a diphenyl type, a benzophenone type, a monoiodoaryl type, a benzothiazole type, a benzothiazole sulfenamide type, a thiuram type, a iodobiphenyl type, and a dithiocarbamate type. More specifically, the polymerization terminator may be at least one selected from the group consisting of diphenyl sulfide, diphenyl ether, benzophenone, dibenzothiazole disulfide, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N,N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide.

Meanwhile, the timing of adding the polymerization terminator can be determined in consideration of the target viscosity or the target molecular weight of the polyarylene sulfide resin. Specifically, the polymerization terminator may be added when 70 to 100% by weight of the diiodide aromatic compound contained in the initial reactant has exhausted by the reaction.

In addition, the conditions for the melt polymerization as described above are not particularly limited as long as they are capable of initiating the polymerization of the reactant, which comprises the diiodide aromatic compound and the sulfur element. For example, the melt polymerization can be carried out under the conditions of an elevated temperature and a reduced pressure, in which the polymerization reaction may be carried out for about 1 to 30 hours while the temperature rises and the pressure drops from the initial reaction conditions of 180 to 250° C. and 50 to 450 torrs to the final reaction conditions of 270 to 350° C. and 0.001 to 20 torrs. Specifically, the polymerization reaction may be carried out under the final reaction conditions of about 280 to 300° C. and about 0.1 to 1 torr.

Meanwhile, the process for preparing a polyarylene sulfide resin may further comprise melt-mixing the reactant, which comprises the diiodide aromatic compound and the sulfur element, before the melt polymerization. The melt mixing is not particularly limited as long as the mixture can be melt-mixed. For example, it may be carried out at a temperature of 130 to 200° C. or 160 to 190° C. If the melt mixing step is carried out before the melt polymerization as described above, the melt polymerization to be subsequently carried out can proceed more readily.

According to an embodiment of the present invention, the melt polymerization of the polyarylene sulfide resin can be carried out in the presence of a nitrobenzene-based catalyst. In addition, if the melt mixing step is carried out before the melt polymerization as described above, the nitrobenzene-based catalyst may be added in the melt mixing step. For example, the nitrobenzene-based catalyst may be 1,3-diiodo-4-nitrobenzene or 1-iodo-4-nitrobenzene, but it is not limited thereto.

Transition Metal Particle

The transition metal particle may be employed in an amount of 0.05 to 5.0% by weight based on the total weight of the resin composition. Specifically, the transition metal particle may be employed in an amount of 0.05 to 3.0% by weight, 0.1 to 3.0% c by weight, 0.1 to 2.0% by weight, or 0.1 to 1.0% by weight, based on the total weight of the resin composition. More specifically, it may be employed in an amount of 0.2 to 0.7% by weight or 0.2 to 1.0% by weight.

If the transition metal particle is employed in an amount within the above range, the mechanical strength and anti-corrosion characteristics of the resin composition are enhanced.

The transition metal particle prevents thermal decomposition of the polymer chain during the high-temperature processing of the resin composition and suppresses gas formation due to byproducts, thereby enhancing the heat resistance and mechanical strength. Thus, the resin composition comprising it does not cause corrosion of the metal mold at the time of injection molding, which makes continuous injection possible.

The transition metal particle may comprise at least one transition metal selected from the group consisting of copper, nickel, titanium, palladium, chromium, gold, zinc, iron, molybdenum, cobalt, silver, and platinum. Specifically, the transition metal particle may comprise at least one transition metal selected from the group consisting of copper, nickel, titanium, zinc, chromium, and gold.

The transition metal particle has an average diameter of 0.1 to 10 μm. It may have a spherical shape, a plate shape, an amorphous shape, or a mixture thereof. Specifically, the transition metal particle has an average diameter of 1 to 10 μm, 1 to 8 μm, or 2 to 8 μm, and a spherical shape, a plate shape, an amorphous shape, or a mixture thereof.

Fibrous Inorganic Filler

The fibrous inorganic filler serves to improve the heat resistance and mechanical strength of the resin composition.

The fibrous inorganic filler may comprise at least one selected from the group consisting of a glass fiber, a carbon fiber, a silica fiber, a potassium titanate fiber, a titanium fiber, an aramid fiber, and an asbestos fiber. Specifically, the fibrous inorganic filler may be a glass fiber. More specifically, the fibrous inorganic filler may be an alumino-borosilicate glass fiber.

The fibrous inorganic filler may have an average diameter of 6 to 15 μm and an average length of 1 to 5 mm. Specifically, the fibrous inorganic filler may have an average diameter of 6 to 13 μm or 9 to 12 μm and an average length of 2 to 5 mm.

The fibrous inorganic filler may be surface-treated in order to improve the interfacial adhesion with the resin. Specifically, the fibrous inorganic filler may be surface-treated with a silane selected from the group consisting of amino-based silane, epoxy-based silane, urethane-based silane, and a combination thereof.

The fibrous inorganic filler may be employed in an amount of 20 to 65% by weight based on the total weight of the resin composition. Specifically, the fibrous inorganic filler may be employed in an amount of 30 to 55% by weight, 35 to 55% by weight, or 35 to 50% by weight, based on the total weight of the resin composition. If the fibrous inorganic filler is employed in an amount of 20% by weight or more, the physical properties may be reinforced due to the addition of the fibrous inorganic filler. If it is employed in an amount of 65% by weight or less, it is possible to prevent the problem that the processability of the resin composition is reduced.

Inorganic Nucleating Agent

The inorganic nucleating agent acts as a primary crystal nucleus of the crystalline polymer to expedite the crystal growth and to increase the crystallization speed while reducing the crystal size.

In particular, if the resin composition comprises an inorganic nucleating agent, the crystallization speed is expedited, so that the cycle time during injection molding is reduced, and the degree of crystallization can be increased even in a low-temperature mold. Especially, the surface characteristics of an article produced from a polyarylene sulfide resin would greatly change according to the mold temperature during injection molding. In general, when the mold temperature is 130° C. or lower, such surface defects as protrusions of the filler would be generated on the surface of the product. However, if the resin composition comprises an inorganic nucleating agent, the crystallization speed of the resin composition is expedited even when the mold temperature is low, thereby significantly enhancing the appearance quality of the molded article.

The inorganic nucleating agent may be a boron-based nucleating agent such as talc. Specifically, the inorganic nucleating agent may comprise at least one selected from the group consisting of a borate, boron sulfide ($B_2S_3$), boron chloride ($BCl_3$), boron acid ($H_3BO_3$), colemanite, zinc borate, boron carbide ($B_4C$), boron nitride (BN), and boron oxide ($B_2O_3$). Specifically, the inorganic nucleating agent may be boron nitride (BN), boron oxide, or a combination thereof. More specifically, the inorganic nucleating agent may comprise 5% by weight or less, or 0.5% by weight, of boron oxide ($B_2O_3$) and 95% by weight of boron nitride (BN) based on the total weight of the inorganic nucleating agent. More specifically, the inorganic nucleating agent may comprise 0.01 to 0.5% by weight of boron oxide ($B_2O_3$) and 99.5 to 99.99% by weight of boron nitride (BN) based on the total weight of the inorganic nucleating agent.

The zinc borate may be at least one selected from the group consisting of $Zn_2O_{14} \cdot 5H_7B_6$, $Zn_4O_8B_2H_2$, and $Zn_2O_{11}B_6$.

The inorganic nucleating agent may be employed in an amount of 0.1 to 2% by weight based on the total weight of the resin composition. Specifically, the inorganic nucleating agent may be employed in an amount of 0.1 to 1.5% by weight, or 0.1 to 1% by weight, based on the total weight of the resin composition. If the inorganic nucleating agent is employed in an amount within the above amount range, the cooling time is shortened, thereby enhancing the moldability of the product, and the processing time is reduced, thereby enhancing the processing efficiency of the product.

Compatibilizer

The resin composition may further comprise a compatibilizer.

The compatibilizer is an agent for reinforcing the physical properties. It serves to improve the interfacial adhesion between the polyarylene sulfide and the fibrous inorganic filler by enhancing the compatibility between them.

The compatibilizer may be a silane. Specifically, the resin composition may further comprise at least one compatibilizer selected from the group consisting of an epoxy-based silane, a mercapto-based silane, and an amino-based silane.

The compatibilizer may be a dry silane. The dry silane may be prepared by supporting a liquid silane on an inorganic material that comprises micropores. The amount of silane contained in the dry silane may be 50 to 80% by weight, or 60 to 75% by weight, of the total weight of the dry silane. The liquid silane may be selected from the group consisting of an epoxy silane, a mercapto silane, and an amino silane.

The resin composition may comprise the compatibilizer in an amount of 1.0% by weight or less based on the total weight of the resin composition. Specifically, the resin composition may comprise the compatibilizer in an amount of 0.1 to 1.0% by weight, 0.1 to 0.8% by weight, or 0.3 to 0.7% by weight, based on the total weight of the resin composition.

The resin composition may further comprise at least one additive selected from the group consisting of a heat stabilizer, a lubricant, an antistatic agent, a slip agent, and a pigment.

Molded Article

The present invention provides a molded article produced by molding the resin composition.

The molded article may be an automobile part and an electric or electronic part.

The molded article may be produced by molding the resin composition of the present invention by a method known in the art such as biaxial extrusion, injection, and the like. For example, the molded article may be in the various forms of a film, a sheet, a thin layer, or a fiber. In addition, the molded article may be an injection molded article, an extrusion molded article, a thin-layer molded article, or a blow molded article. Specifically, the molded article may be a thin-layer molded article or an injection molded article.

Specifically, if a molded article is produced by injection molding, the mold temperature may be set to about 130° C. or higher. In the case where the molded article is in the form of a film or a sheet, it may be various films or sheets, for instance, unstretched, uniaxially stretched, or biaxially stretched. In the case where the molded article is a fiber, it may be various fibers such as an undrawn yarn, a drawn yarn, or a highly drawn yarn. It may be used as a fabric, a knitted fabric, a nonwoven fabric (e.g., spunbond, meltblown, and staple), a rope, or a net. The molded article may be used an electric part such as a computer part, an electronic part, a building member, an automobile part, a mechanical part, a daily necessity, a coating for parts in contact with chemicals, or a chemical resistant textile for industrial uses.

MODE FOR THE INVENTION

Hereinafter, the present invention will be described in more detail with reference to the following examples. However, these examples are set forth to illustrate the present invention, and the scope of the present invention is not limited thereto.

Preparation Example 1: Preparation of PPS-1

A 5-liter reactor equipped with a thermocouple capable of measuring the temperature inside the reactor and a vacuum line capable of nitrogen purging and vacuum application was charged with 5,130 g of p-diiodobenzene (p-DIB) and 450 g of sulfur. The reactor was then heated to 180° C. to completely melt and mix p-DIB and sulfur. Thereafter, the temperature rose and the pressure dropped gradually from the initial reaction conditions of 220° C. and 350 torrs to the final reaction conditions of 300° C. and 0.6 to 0.9 torr, and the polymerization reaction was carried out while sulfur was added in seven times in an amount of 19 g in each addition. The progress of the polymerization reaction was measured as a relative ratio of the present viscosity to the target viscosity by the equation "(current viscosity/target viscosity)×100%." The target viscosity was set for 2,000 poises, and the present viscosity was measured with a viscometer for a sample collected during the polymerization reaction. When the polymerization reaction proceeded to 80% of completion, 35 g of diphenyl disulfide was added as a polymerization terminator, and the reaction was carried out for 1 hour. Thereafter, a vacuum was gradually applied at 0.1 to 0.5 torr to reach the target viscosity, and the reaction was terminated to synthesize a polyphenylene sulfide resin (PPS-1 resin). The resin thus prepared was processed in the form of pellets using a small strand cutter.

The PPS-1 resin thus obtained was measured for the melting point (Tm), number average molecular weight (Mn), polydispersity index (PDI), and melt viscosity (MV) in accordance with the following methods. As a result, it had a melting point of 280° C., an Mn of 11,420 g/mole, a PDI of 2.8, and a melt viscosity of 2,150 poises.

Melting Point

The temperature was elevated from 30° C. to 320° C. at a rate of 10° C./min in a differential scanning calorimeter (DSC), and the temperature was cooled to 30° C., followed by a temperature elevation again from 30° C. to 320° C. at a rate of 10° C./min to measure the melting point.

Number Average Molecular Weight (Mn) and Polydispersity Index (PDI)

The PPS resin was dissolved in 1-chloronaphthalene at a concentration of 0.4% by weight with stirring at 250° C. for 25 minutes to prepare a sample. Then, the sample was flowed at a flow rate of 1 ml/min in a high-temperature gel permeation chromatography (GPC) system (at 210° C.) and sequentially separated in the column to polyphenylene sulfides having different molecular weights. Thereafter, the intensity of the separated polyphenylene sulfides having different molecular weights was measured with an RI detector. A calibration curve was prepared with a standard sample (i.e., polystyrene) having a known molecular weight, and the number average molecular weight (Mn) and the polydispersity index (PDI) of the sample were calculated.

Melt Viscosity (MV)

The melt viscosity was measured with a rotating disk viscometer at 300° C. In the measurement by the frequency sweep method, an angular frequency was measured from 0.6 rad/s to 500 rad/s, and the viscosity at 1.84 rad/s was defined as the melt viscosity.

Preparation Example 2 Preparation of a PPS-2 Resin

A PPS-2 resin was prepared in the same manner as in Preparation Example 1, except that the target viscosity was adjusted. PPS-2 had a melt viscosity of 1,980 poises, a melting point of 281° C., an Mn of 17,290 g/mole, and a PDI of 2.9.

The components used in the Examples and the Comparative Examples are shown in Table 1 below.

TABLE 1

| Component | Properties |
|---|---|
| PPS-1 | MV: 2,150 poises, Tm 280° C., Mn: 11,420 g/mole |
| PPS-2 | MV: 1,980 poises, Tm 281° C., Mn: 17,290 g/mole |
| Glass fiber | Jushi-584 (diameter: 11 μm, length: 4.5 mm, surface treated with an amino silane) |
| Compatibilizer | Dry silane (A-187/calcium silicate 7/3) |
| Boron-based nucleating agent | BN (manufacturer: 3M, brand name: BRONID)-006) (particle size: 8 μm, $B_2O_3$ content: 0.3% or less, BN content: 99% or more) |
| Transition metal particle | Cu powder (particle size: 3.5 μm, flake type, Cu content 99% or more) |

Example 1: Preparation of a Resin Composition 59.3% by weight of the PPS-1 resin obtained in Preparation Example 1, 40% by weight of the glass fiber surface-treated with an amino silane, 0.2% by weight of the boron-based nucleating agent, and 0.5% by weight of the transition metal particle were fed to a biaxial screw extruder for mixing to prepare a resin composition.

The biaxial screw extruder had a diameter of 40 mm and an L/D of 44 (SM Platek). The extrusion conditions were a screw speed of 250 rpm, a feed rate of 40 kg/hour, a barrel temperature of 280° C. to 320° C., and a torque of 60%. The raw materials were separately fed through a total of two feeders, in which the first feeder was used to feed the PPS-1 resin, the boron-based nucleating agent, and the transition metal particle; and the second feeder to feed the glass fiber, to thereby prepare a PPS resin composition.

Examples 2 to 6 and Comparative Examples 1 to 4

PPS resin compositions were prepared in the same manner as in Example 1, except that the components and their amounts were as shown in Table 2 below.

TABLE 2

| Component (% by weight) | PPS-1 | PPS-2 | Glass fiber | Boron-based nucleating agent | Com-patibilizer | Transition metal particle |
|---|---|---|---|---|---|---|
| Ex. 1 | 59.3 | — | 40 | 0.2 | — | 0.5 |
| Ex. 2 | 58.8 | — | 40 | 0.2 | 0.5 | 0.5 |
| Ex. 3 | — | 59.3 | 40 | 0.2 | — | 0.5 |
| Ex. 4 | — | 58.8 | 40 | 0.2 | 0.5 | 0.5 |
| Ex. 5 | 59.2 | — | 40 | 0.2 | 0.5 | 0.1 |
| Ex. 6 | 58.3 | — | 40 | 0.2 | 0.5 | 1.0 |
| Comp. Ex. 1 | 59.8 | — | 40 | 0.2 | — | — |
| Comp. Ex. 2 | 59.3 | — | 40 | 0.2 | 0.5 | — |
| Comp. Ex. 3 | — | 59.8 | 40 | 0.2 | — | — |
| Comp. Ex. 4 | — | 59.3 | 40 | 0.2 | 0.5 | — |

Test Example Measurement of Physical Properties

The PPS resin compositions prepared in Examples 1 to 6 and Comparative Examples 1 to 4 were each measured for the physical properties according to the methods as described below, and the measurement results are shown in Table 3 below. First, the PPS resin compositions prepared in Examples 1 to 6 and Comparative Examples 1 to 4 were each injection molded at 310° C. to prepare an injection molded specimen, which was measured for the physical properties.

(1) Tensile Strength and Elongation

The tensile strength and elongation of the test specimen were measured using a Universal Testing Machine (Zwick Roell Z010) according to the ISO 527 method.

(2) Impact Strength

The impact strength of the injection molded specimen of 80 mm×10 mm×4 mm (length×width×thickness) was measured using a Charpy Impact Tester (Toyoseiki) according to the ISO 179 method.

(3) Flexural Strength and Flexural Modulus

The flexural strength and flexural modulus of the injection molded specimen of 80 mm×10 mm×4 mm (length×width×thickness) were measured according to the ISO 178 method.

(4) Heat Distortion Temperature (HDT)

The heat distortion temperature (HDT) of the injection molded specimen of 80 mm×10 mm×4 mm (length×width×thickness) was measured according to the ISO 75 method.

(5) Anticorrosion

A steel plate and an injection molded specimen were placed in a cycle oven equipped with a pressurizing device. The specimen was interposed with the steel plate, pressed with a weight of 2 kg, and left under the conditions of 85° C. and 85% humidity. Ten specimens of the same composition were placed in a chamber, one of which was taken out every two minutes to confirm corrosion. In such event, the time at which the first corrosion occurred was recorded. The size of the injection molded specimen was 60 mm×40 mm×2 mm. The steel plate for Anticorrosion-1 was stainless steel (manufactured by POSCO, brand name: 304LN), and that for Anticorrosion-2 was nickel-plated steel (manufactured by Shinsung Chemical Co., Ltd., brand name: NiKlad 752).

(6) Outgass

The pellet type samples (10 mg) of Example 1 and that of Comparative Example 1 were each maintained at 320° C. for 30 minutes using an isothermal thermogravimetric analyzer (TGA) to measure the amount of outgas generated in 5-minute increments (i.e., generation rate (%)). The measurement results are shown in Table 4 below.

TABLE 4

| Condition | Unit | Ex. 1 | Comp. Ex. 1 |
| --- | --- | --- | --- |
| 320° C., after 05 minutes | % | 0.119 | 0.133 |
| 320° C., after 10 minutes |   | 0.174 | 0.193 |
| 320° C., after 15 minutes |   | 0.221 | 0.242 |
| 320° C., after 20 minutes |   | 0.249 | 0.276 |
| 320° C., after 25 minutes |   | 0.274 | 0.298 |
| 320° C., after 30 minutes |   | 0.295 | 0.328 |

(7) Haze

The injection molded specimens of 80 mm×10 mm×4 mm of Example 1 and Comparative Example 1 were each maintained at 230° C. for 5 hours to measure the changes in haze before and after the test. The measurement results are shown in Table 5 below.

TABLE 5

| Condition | Unit | Ex. 1 | Comp. Ex. 1 |
| --- | --- | --- | --- |
| 230° C., maintained for 5 hours | % | 3.16 Opaque gas | 27.45 Yellow gas |

As shown in Tables 4 and 5, the resin composition of Example 1, which comprised the transition metal particle, had a low haze, whereas that of Comparative Example 1,

TABLE 3

| Item | Unit | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| --- | --- | --- | --- | --- | --- | --- | --- | --- | --- | --- | --- |
| Tensile strength | Mpa | 151 | 195 | 160 | 205 | 187 | 200 | 136 | 186 | 126 | 187 |
| Tensile elongation | % | 1.3 | 1.8 | 1.4 | 1.8 | 1.6 | 1.8 | 1.2 | 1.6 | 1.1 | 1.6 |
| Flexural strength | Mpa | 231 | 269 | 242 | 284 | 256 | 280 | 206 | 254 | 179 | 277 |
| Flexural modulus | Gpa | 14.7 | 14.8 | 14.7 | 14.6 | 14.1 | 13.9 | 14.5 | 14.6 | 14.4 | 14.8 |
| Impact strength (notched) | kJ/m$^2$ | 6.8 | 8.8 | 7.2 | 10.2 | 9.2 | 8.9 | 6.8 | 9.2 | 5.5 | 9.4 |
| Impact strength (un-notched) | kJ/m$^2$ | 24.4 | 41.1 | 34.1 | 46.2 | 31.4 | 40.7 | 23.1 | 30.5 | 15.7 | 31.6 |
| Heat distortion temperature | ° C. | 266 | 266 | 266 | 266 | 265 | 266 | 266 | 265 | 266 | 266 |
| Anticorrosion-1 | Minute | 14.8 | 14.6 | 13.6 | 13.8 | 12.6 | 14.7 | 12.4 | 12.3 | 11.5 | 11.6 |
| Anticorrosion-2 | Minute | 13.6 | 13.3 | 12.5 | 12.5 | 11.7 | 13.4 | 11.3 | 11.6 | 10.7 | 10.8 |

As shown in Table 3 above, the resin compositions of Examples 1 to 6, which comprised the transition metal particle, were excellent in tensile strength, tensile elongation, flexural strength, flexural modulus, impact strength, heat distortion temperature, and anticorrosion. Meanwhile, the resin compositions of Comparative Examples 1 to 4, which did not comprise the transition metal particle, were poor in anticorrosion. In particular, the resin compositions of Comparative Example 3, which comprised PPS-2 without the transition metal particle, showed significantly lower tensile strength, flexural strength, and impact strength as compared with Example 3.

which did not comprise the transition metal particle, had a significantly increased haze. It was confirmed from the above that the haze of the product due to the outgas generated in the high-temperature environment can be significantly reduced by adding transition metal particles.

(8) Short-Term Heat Resistance

The ASTM flexural specimens of 0.8 mm in Examples 1 and 2 and Comparative Examples 1 and 2 were each aged for 7 minutes and 14 minutes in a high-temperature oven at 250° C. and subjected to 21-minute cycle aging (3 times of 7-minute aging and 7-minute pause) to evaluate the heat resistance. The heat resistance was evaluated by measuring the flexural strength after aging relative to the flexural strength measured before aging as 100%. The results are shown in Table 6 below.

TABLE 6

| Condition | Unit | Ex. 1 | Ex. 2 | Comp. Ex. 1 | Comp. Ex. 2 |
|---|---|---|---|---|---|
| Initial | % | 100.0 | 100.0 | 100.0 | 100.0 |
| 7 minutes | % | 92.3 | 94.8 | 94.7 | 91.1 |
| 14 minutes | % | 98.7 | 97.8 | 93.4 | 91.5 |
| 21-minute cycle | % | 97.3 | 101.1 | 74.1 | 81.5 |

As shown in Table 6, the resin compositions of Examples 1 and 2, which comprised the transition metal particle, were excellent in heat resistance, whereas those of Comparative Examples 1 and 2, which did not comprise the transition metal particle, had significantly low heat resistant values.

As a result, the resin compositions of Examples 1 to 6 were excellent in haze characteristics and heat stability as well as excellent in mechanical strength and anticorrosion due to the addition of a transition metal. In contrast, those of Comparative Examples 1 to 4, which did not comprise a transition metal, were poor in all or some of these properties. Thus, they are not appropriate as a raw material for automobile parts and electric and electronic parts.

The invention claimed is:

1. A resin composition, which comprises
a polyarylene sulfide resin in an amount of 40 to 65% by weight,
a transition metal particle in an amount of 0.05 to 5.0% by weight,
a fibrous inorganic filler in an amount of 30 to 55% by weight, and
an inorganic nucleating agent in an amount of 0.1 to 2% by weight, each based on a total amount of the resin composition.

2. The resin composition of claim 1, wherein the polyarylene sulfide resin has a melt viscosity of 300 to 10,000 poises at 300° C. and a number average molecular weight of 7,000 to 30,000 g/mole.

3. The resin composition of claim 1, wherein the transition metal particle has an average diameter of 0.1 to 10 μm and is spherical-shaped and/or plate-shaped.

4. The resin composition of claim 1, wherein the transition metal particle comprises one or more transition metal selected from the group consisting of copper, nickel, titanium, zinc, chromium, and gold.

5. The resin composition of claim 1, wherein the fibrous inorganic filler has an average diameter of 6 to 15 μm and an average length of 1 to 5 mm, and is surface-treated with a silane selected from the group consisting of amino-based silane, epoxy-based silane, urethane-based silane, and combinations thereof.

6. The resin composition of claim 1, wherein the fibrous inorganic filler is an alumino-borosilicate glass fiber.

7. The resin composition of claim 1, wherein the inorganic nucleating agent comprises one or more selected from the group consisting of a borate, boron sulfide ($B_2S_3$), boron chloride ($BCl_3$), boron acid ($H_3O_3$), colemanite, zinc borate, boron carbide ($B_4C$), boron nitride (BN), and boron oxide ($B_2O_3$).

8. The resin composition of claim 1, which further comprises one or more compatibilizer selected from the group consisting of an epoxy-based silane, a mercapto-based silane, and an amino-based silane.

9. The resin composition of claim 1, which further comprises one or more additive selected from the group consisting of a heat stabilizer, a lubricant, an antistatic agent, a slip agent, and a pigment.

10. The resin composition of claim 1, wherein the transition metal particle has an average diameter of 0.1 to 10 μm and is amorphous.

11. A molded article produced by molding the resin composition of claim 1.

12. The molded article of claim 11, which is an automobile part, an electric part, or an electronic part.

13. The molded article of claim 11, which is a thin-layer molded article or an injection molded article.

14. A molded article produced by molding the resin composition of claim 2.

15. A molded article produced by molding the resin composition of claim 3.

16. A molded article produced by molding the resin composition of claim 5.

17. A molded article produced by molding the resin composition of claim 7.

18. A molded article produced by molding the resin composition of claim 8.

19. A molded article produced by molding the resin composition of claim 10.

* * * * *